United States Patent [19]

Stach

[11] 3,896,189
[45] July 22, 1975

[54] S-(2-METHOXYIMINOETHYL) O-ETHYL-N-ISOPROPYLTHIOLO-PHOSPHORAMIDATE

[75] Inventor: Leonard J. Stach, Riverside, Ill.

[73] Assignee: Velsicol Chemical Corporation, Chicago, Ill.

[22] Filed: Sept. 5, 1972

[21] Appl. No.: 286,486

[52] U.S. Cl. .............................. 260/944; 424/211
[51] Int. Cl. ......................... C07f 9/24; A01n 9/36
[58] Field of Search ..................................... 260/944

[56] References Cited
UNITED STATES PATENTS
3,574,793  4/1971  Richter et al. ..................... 260/944

Primary Examiner—Anton H. Sutto
Attorney, Agent, or Firm—Robert J. Schwarz; Dietmar H. Olesch

[57] ABSTRACT

This invention discloses the new compound S-(2-methoxyiminoethyl) O-ethyl N-isopropylthiolophosphoramidate and insecticidal and acaricidal compositions prepared therefrom.

1 Claim, No Drawings

S-(2-METHOXYIMIOETHYL)O-ETHYL-N-ISOPROPYLTHIOLO-PHOSPHORAMIDATE

This invention relates to the new compound S-(2-methoxyiminoethyl) O-ethyl N-isopropylthiolophosphoramidate. This compound is useful as an insecticide and an acaricide.

The preparation of the new compound of the present invention is shown in the following examples.

EXAMPLE 1

Preparation of 1-Chloro-2-methoxyiminoethane

An aqueous solution of chloroacetaldehyde (12.0 grams; 0.15 mole; 45% concentration), methoxyamine hydrochloride (16.7 grams; 0.20 mole) and water (20 ml) were charged into a glass reaction flask equipped with a mechanical stirrer. The mixture was stirred at room temperature for a period of about 20 minutes resulting in the formation of an oil phase. The oil phase was extracted with ether and the ether solution dried over anhydrous magnesium sulfate. The dried ether solution was then filtered and distilled to yield the desired product 1-chloro-2methoxyiminoethane as a colorless liquid, b.p. 106°–108°C.

EXAMPLE 2

Preparation of S-(2-Methoxyiminoethyl) O-Ethyl N-Isopropylthiolophosphoramidate S-Potassium O-ethyl N-isopropylthiolophosphoramidate (19.0 grams; 0.086 mole), 1-chloro-2-methoxyiminoethane (8.0 grams; 0.075 mole) and methyl ethyl ketone (80 ml) were charged into a glass reaction flask equipped with a mechanical stirrer and reflux condenser. The reaction mixture was heated at reflux, with stirring, for a period of about 18 hours. After this time the reatcion mixture was cooled to room temperature and was filtered. The filtrate was evaporated and the residue was dissolved in ether. The ether solution was then washed with water and was dried over anhydrous magnesium sulfate. The dried solution was stripped of solvent to yield a red oil. This oil was heated to a temperature of 50°C at 0.15 mm of Hg pressure for a period of about 10 minutes to remove any volatiles. The remaining oil was then filtered to yield the desired product S-(2-methoxyiminoethyl) O-ethyl N-isopropylthiolophosphoramidate having the following structural formula:

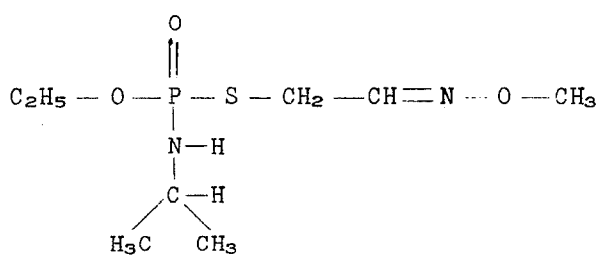

For practical use as an insecticide or acaricide, the compound of this invention is generally incorporated into insecticidal or acaricidal compositions which comprise an inert carrier and an insecticidally or acaricidally toxic amount of the compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

The active compound is sufficiently soluble in common organic solvents such as kerosene or xylene so that it can be used directly as solutions in these solvents. Solutions of the insecticide or acaricide can be dispersed under superatmospheric pressure as aerosols. However, a preferred liquid insecticidal or acaricidal composition is an emulsifiable concentrate, which comprises the active compound of this invention and as the inert carrier, a solvent and an emulsifier. Such emulsifiable concentrates can be extended with water and/or oil to any desired concentration of the active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

Example 3

Preparation of a Dust

| | |
|---|---|
| Product of Example 2 | 10 |
| Powdered talc | 90 |

The above ingredients are mixed in a mechanical grinder-blender and are ground until a homogeneous, freeflowing dust of the desired particle size is obtained. This dust is suitable for direct application to the site of the insect or acarid infestation.

The compound of this invention can be applied as an insecticide or acaricide in any manner recognized by the art. One method for destroying insects or acarids comprises applying to the locus of the insect or acarid infestation, an insecticidal or acaricidal composition comprising an inert carrier and as an essential active ingredient, in a quantity which is toxic to said insects or acarids, the compound of the present invention. The concentration of the new compound of this invention in the insecticidal or acaricidal compositions will vary greatly with the type of formulation and the purpose for which it is designed, but generally the insecticidal or acaricidal compositions will comprise from about 0.05 to about 95 percent by weight of the active compound of this invention. In a preferred embodiment of this invention, the insecticidal or acaricidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compound of the present invention is also useful when combined with other insecticides or acaricides in the compositions heretofore described. These other insecticides or acaricides can comprise from about 5 to about 95 percent of the active ingredients in the compositions. Use of the combinations of these other insecticides or acaricides with the compound of the present invention provide insecticidal and/or acaricidal compositions which are more effective in controlling insects or acarids and often provide results unattainable with separate compositions of the individual compounds. The other insecticides or acaricides with which the compound of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis (2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compound of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane and the like.

The new compound of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compound when applied to the soil or plant surfaces is taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compound of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of the active compound of this invention to be used for insect or acarid control will depend on a variety of factors, such as the specific insect involved, intensity of the infestation, weather, type of environment, type of formulation and the like. For example, the application of only one or two ounces of active chemical per acre may be adequate for control of a light infestation of an insect or acarid under conditions unfavorable for its feeding, while a pound or more of active compound per acre may be required for the control of a heavy infestation of insect or acarids under conditions favorable to their development.

The insecticidal and acaricidal activity of the compound of this invention was demonstrated in the following test procedures. The results of each of these procedures are set forth in Table I.

Mexican Bean Beetle and Southern Armyworm-Stomach Poison

Foliar portions of potted Dwarf Horticultural bean plants in first true leaf growth stage are dipped in agitated test solution containing the compound of this invention, allowed to air dry and removed to holding racks provided with a subterranean water source. Three test plants are used for each test unit. Five third-instar larvae each of Mexican Bean Beetle and Southern Armyworm are respectively caged on treated plants for 72 hours. After this time observations are made for insect mortality.

Two-Spotted Spider Mite — Contact Poison and Ovicidal Action

Potted horticultural beans at growth stage when primary leaves are approximately one inch long are infested with two-spotted spider mites 24 hours prior to treatment, insuring establishment of adults and egg deposition at time of treatment.

The candidate compound is dissolved in a suitable solvent (acetone, methanol or other) or prepared as wettable powders and diluted to appropriate concentrations with deionized water containing wetting and/or dispersing agents as appropriate.

Infested host plants, as above, are dipped in agitated solutions of the candidate compound, allowed to air dry, provided with subterranean water source and held for observation. Three plants are used for each unit of treatment.

Initial mortality and phytotoxicity are determined 48 to 72 hours after treatment by removing and observing one leaf from each plant. Final observations of mortality and ovicidal actions are made 7 days after treatment by removal and observation of the second primary leaf.

Two Spotted Spider Mite — Systemic Action

Cranberry bean plants grown under greenhouse conditions, in first true leaf growth stage and in soil of low moisture content are infested during a two-hour period with Two-Spotted Spider Mites (*Tetranychus telarius*). Twenty ml. of an aqueous solution of the candidate compound are applied to the soil as a surface drench. Twenty-four hours later plants are provided subterranean watering for 48 hours. Percentage mite mortality is observed 96 hours after application of the candidate compound to the soil surface. All test units are in triplicate.

Housefly — Liquid Bait

The candidate compound is prepared as an acetone or wettable powder-based aqueous formulation containing 5 percent (W:V) dissolved granular sugar. One milliliter, expressed in ppm active ingredient, is pipetted onto the center of a 9 cm petri dish. Two-day old housefly adults, loaded into a 4-inch hemispherical wire mesh container, are then caged over the liquid bait. Approximately 6 hours later a water-moistened wad of cellucotton is placed on top of the wire mesh cage and retained there overnight.

Observations are made for 24-hour mortality. Mortality induced may be by ingestion, contact or repellent-induced starvation.

Boll Weevil — Liquid Bait

The candidate compound is prepared as an acetone or wettable powder-based aqueous formulation containing 5 percent (W:V) dissolved granular sugar. One milliliter, expressed in ppm active ingredient, is pipetted onto a 9 cm filter paper in a 9 cm petri dish. Five Boll Weevil adults are introduced and the petri dish cover affixed.

Observations are made for mortality after 72 hours. Mortality induced may be by contact, ingestion or fumigant action.

TABLE I

TEST RESULTS
Percent Control
Insect and Test Procedure*

| Concentration of Test Cpd. ppm | MBB-SP | SAW-SP | TSM-C | TSM-O | HF-B | BW-B | TSM-S |
| --- | --- | --- | --- | --- | --- | --- | --- |
| 1000 | 100 | 100 | 100 | 100 | 100 | 100 | — |
| 500 | 100 | 100 | 100 | 100 | 100 | 100 | — |
| 250 | 100 | 100 | 100 | 100 | 100 | 100 | — |
| 100 | 100 | 100 | 100 | 100 | 100 | 100 | — |
| 50 | 100 | 50 | 100 | 80 | 100 | 100 | 100 |
| 25 | 100 | 0 | 100 | 0 | 100 | 100 | 100 |
| 10 | 10 | 0 | 70 | 0 | 21 | 70 | 100 |
| 5 | — | — | — | — | — | — | 100 |
| 1.0 | — | — | — | — | — | — | 100 |

*MBB-SP = Mexican Bean Beetle-Stomach Poison
SAW-SP = Southern Army Worm - Stomach Poison
TSM-C = Two Spotted Spider Mite - Contact Poison
TSM-O = Two Spotted Spider Mite - Ovicidal Action
HF-B = Housefly - Bait
BW-B = Boll Weevil - Bait
TSM-S = Two Spotted Spider Mite - Systemic

I claim:

1. The compound S-(2-methoxyiminoethyl) O-ethyl N-isopropylthiolophosphoramidate.

* * * * *